United States Patent [19]

Petz

[11] 4,407,534
[45] Oct. 4, 1983

[54] ARRANGEMENT FOR CONNECTING EDGE AREAS OF THIN-WALLED BODIES

[76] Inventor: Günter Petz, Flachslander Str. 8, Nürnberg D 8500, Fed. Rep. of Germany

[21] Appl. No.: 199,346

[22] Filed: Oct. 21, 1980

[30] Foreign Application Priority Data

Jan. 2, 1980 [EP] European Pat. Off. ....... 80100 001.9

[51] Int. Cl.³ .............................................. F16L 37/14
[52] U.S. Cl. .................................. 285/305; 285/424; 403/364; 138/158
[58] Field of Search ............... 285/305, 421, DIG. 14, 285/424, 403; 403/364, 355, 356; 138/158–167; 16/262; 52/585, 582, 284, 285

[56] References Cited

U.S. PATENT DOCUMENTS

| 1,196,428 | 8/1916 | Briel | 16/262 X |
|---|---|---|---|
| 2,181,831 | 11/1939 | McLaughlin | 52/282 X |
| 2,521,279 | 9/1950 | Becker | 52/285 X |
| 2,753,962 | 7/1956 | McBerty | 403/364 |
| 2,886,830 | 5/1959 | Iaquinta | 16/262 X |
| 3,323,819 | 6/1967 | Barker | 52/285 X |
| 3,455,336 | 7/1969 | Ellis | 138/158 X |
| 3,606,402 | 9/1971 | Medney | 285/305 |
| 4,219,081 | 8/1980 | Howe | 403/364 |

FOREIGN PATENT DOCUMENTS 2626395 12/1977 Fed. Rep. of Germany ... 285/DIG. 14

Primary Examiner—Dave W. Arola
Attorney, Agent, or Firm—Bacon & Thomas

[57] ABSTRACT

An arrangement for connecting corresponding edge areas of thin-walled bodies together wherein each edge area is provided with bending sections and empty sections alternately disposed to each other with respect to the corresponding bending and empty sections of the other edge area. The bending sections of the other edge area are disposed through the corresponding empty sections of the edge area whereby the bending sections collectively define a common channel through which an elongate connecting member is inserted to secure the bodies together.

1 Claim, 12 Drawing Figures

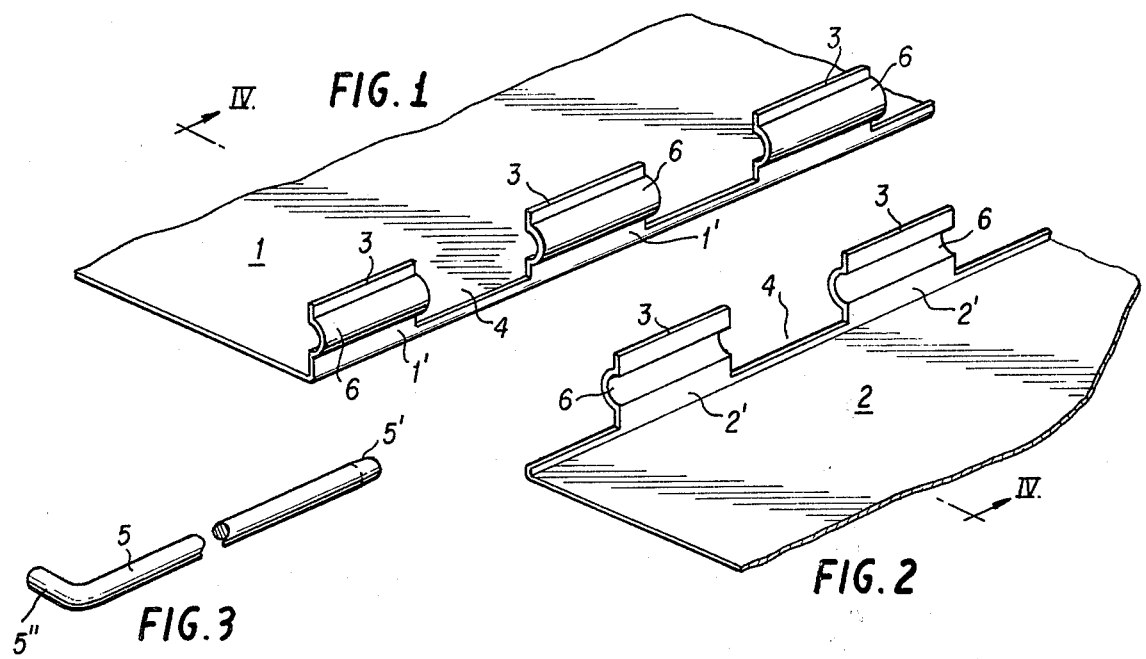
FIG. 1
FIG. 2
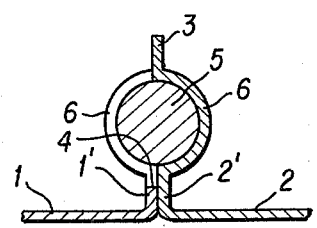
FIG. 3
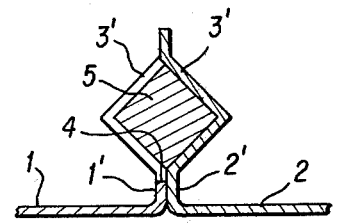
FIG. 4
FIG. 5
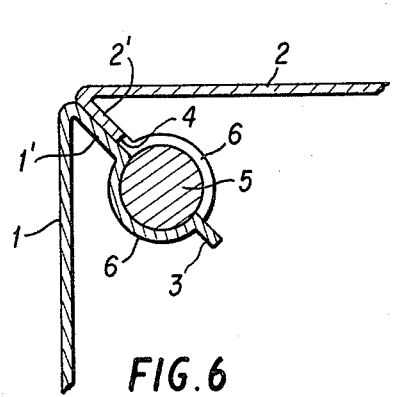
FIG. 6
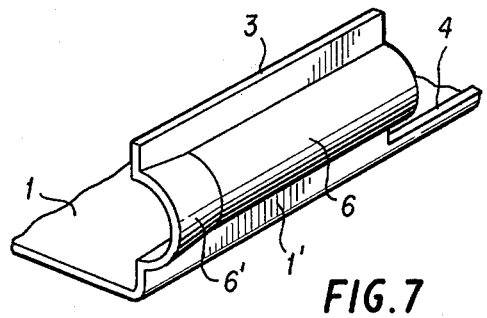
FIG. 7

ARRANGEMENT FOR CONNECTING EDGE AREAS OF THIN-WALLED BODIES

BACKGROUND OF THE INVENTION

1. Field of the Invention

The present invention relates to arrangements for connecting the edge areas of thin-walled bodies together.

2. Description of the Prior Art

It is known to connect adjacent edge or boundary areas of thin-walled bodies placed close to each other by inserting screws or rivets in holes provided in the boundary areas. Aside from the fact that the placing of holes and the insertion of screws or rivets require a considerable manufacturing and technical outlay, there are also many difficulties associated with this procedure when such thin-walled bodies in the form of narrow or high housings are connected together.

SUMMARY OF THE INVENTION

The present invention provides a connection arrangement wherein the edge or boundary areas of the bodies to be connected are each provided with bending sections and empty sections that are alternately disposed with respect to the corresponding bending and empty sections of the other area. When the areas are brought together, the bending sections of each area are passed through the corresponding empty sections of the other area, whereby the bending sections collectively define a channel through which an elongate connecting member, such as a rod, is inserted to secure and support the bodies together.

In a preferred embodiment of the invention, the bending sections and the empty sections are carried by bent corners which define the adjacent edge areas of the bodies to be connected. In this way, the connection of such thin-walled bodies requires only the aforedescribed simple procedure of inserting a rod-shaped member.

The invention also permits the rapid separation of thin-walled bodies by simply removing the rod-shaped connecting member from the channel defined by the bending sections. Moreover, connections made according to the invention display an exact abutting of adjacent ends, thereby dispensing with the need to provide cover strips for the joint formed by the edge areas.

It is therefore an object of the invention to provide for a simpler arrangement through which thin-walled bodies can be connected together without the difficulties associated with heretofore known technology.

These and other objects and advantages of the present invention will become apparent to those skilled in the art by reference to the following description of preferred embodiments thereof when taken in conjunction with the accompanying drawings wherein like reference characters refer to like elements throughout the views.

BRIEF DESCRIPTION OF THE DRAWINGS

FIG. 1 is a fragmentary perspective view of a thin-walled body showing the edge area defined by bending and empty sections;

FIG. 2 is a fragmentary perspective view of another thin-walled body having an edge area defined by bending and empty sections for engagement with the corresponding edge area of the thin-walled body of FIG. 1;

FIG. 3 is a fragmentary perspective view of the connecting member used for connecting the bodies of FIGS. 1 and 2;

FIG. 4 is a fragmentary cross-sectional view taken along the line IV—IV of combined FIGS. 1–3 in an assembled condition;

FIG. 5 is a cross-sectional view similar to FIG. 4 showing another embodiment of the invention;

FIG. 6 is a fragmentary cross-sectional view depicting a third embodiment of the invention;

FIG. 7 is a fragmentary perspective view depicting a bending section provided with an introduction bevel;

DETAILED DESCRIPTION OF THE PREFERRED EMBODIMENTS

Figure 8:
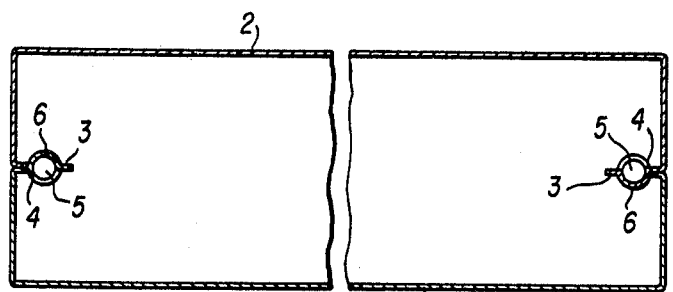
FIG. 8 is a fragmentary cross-sectional view depicting thin-walled bodies in the shape of rectangular half shells joined together according to the invention.

It has proven advantageous that rod-shaped members having a circular cross section be utilized in cylindrical shaped channels defined by the bending sections of associated thin-walled bodies. However, other cross-sectional designs for the rod-shaped connector member and channels are possible. For example, angled bending sections defining a channel having a square cross section can utilize rod-shaped bodies having a corresponding cross-sectional configuration. It is to be understood that the bending sections and corresponding empty sections can be designed in edge areas of thin-walled bodies of virtually any length and height.

The insertion of the rod-shaped connecting member into the channel defined by the bending sections can be facilitated if the inlet end of the channel is provided with a bending section having a flared portion in the form of an inwardly tapered or conical-shaped free end. This serves as an insertion bevel and facilitates insertion of the rod-shaped member into the inlet end of the channel. The insertion bevels can be formed by bending out bodies of sheet metal, or other deformable materials. It can also be formed in bodies made from plastics or die cast metal. It is also possible to form bevels on the bending sections through mechanical working and material abrasion.

The invention may be utilized for connection of bodies disposed in a single plane as well as bodies disposed at angles to each other. Furthermore, the bodies may be connected together by utilizing rod-shaped members made from spring or elastic material, such as spring-loaded elastic rods. Thus, the invention can be utilized with equal success in connecting plane or arched bodies, e.g. connecting body parts in vehicle construction, tube construction, coverings and packages of machines or the erection of any housing for heating and ventilation equipment. Moreover, the invention can be used in building for the connection of facade lining plates.

In order to avoid unintentional shifting of the rod-shaped connecting member, a bent portion may be provided at one end thereof to serve as a stop after the member has been fully inserted within the channel. This bent portion can also be used as a handle for facilitating manipulation of the rod-shaped member.

The invention is not limited to any specific materials making up the bodies to be connected or to any specific forms or designs for same. Also, the invention can be practiced whether the bending sections are bent or tip-stretched.

Reference shall now be made to the drawings wherein some examples of the invention are depicted in conjunction with various designs of thin-walled bodies.

Referring now to FIGS. 1-3, a pair of thin-walled bodies 1 and 2 to be connected together are disposed in the same single plane. Both bodies 1 and 2 are provided with bending sections 3 and empty sections 4 disposed alternately to each other. The bending sections 3 penetrate into corresponding empty sections 4 when bodies 1 and 2 are brought together and secured by inserting a rod-shaped connecting member 5 into the channel defined by adjacent bending sections 3. For example, member 5 may be a wire piece between the bending sections 3 of bodies 1 and 2 and serves to support bodies 1 and 2 together through the channel defined by bending sections 3, thereby connecting bodies 1 and 2 together.

As seen in FIG. 3, the insertion of member 5 is also facilitated by providing member 5 with a tapered free end 5'. It is also preferred that member 5 be provided with a bent portion 5" on its other end for serving as both a stop and handle. Engagement of bent portion 5" facilitates manual insertion and removal of member 5 from the channel defined by bending sections 3.

The rod-shaped member 5 is disposed within the channel defined by individual channel-shaped recesses 6 of the bending sections 3. The recesses 6 collectively define a circular channel or passage as shown in FIG. 4. Member 5 has a corresponding cross-sectional configuration and appropriate diameter for insertion into the channel formed by recesses 6. In the embodiment depicted in FIG. 5, a rod-shaped body 5 having a rectangular or square cross-sectional configuration is utilized with angled recesses 3' which collectively define a channel or passage having a corresponding cross-sectional configuration.

As seen in FIG. 6, bodies 1 and 2 are provided with boundary areas in the form of bent edge corners 1' and 2'. When bodies 1 and 2 are disposed transverse and adjacent to each other for connection, with edge corners 1' and 2' in abutting relationship, bending sections 3 and empty sections 4 are disposed alternately to each other so that bending sections 3 collectively define a channel through which rod-shaped member 5 is inserted. As also seen, bending sections 3 each include a channel-shaped recess 6 as earlier shown in FIGS. 1 and 2. In the embodiment shown in FIG. 6, a closed common separation surface is provided on the exterior of the assembly thereby obviating the need for conventional covers on the exterior joint of this connection.

Referring to FIG. 7, a bending section 3 is shown wherein recess 6 is provided with an outwardly flared conical portion 6' that serves as an introduction bevel to facilitate insertion of the rod-shaped member 5. It is possible to provide such introduction bevels 6' on both ends of a channel defined bending sections 3 to facilitate insertion of member 5 at either end thereof.

In FIG. 8, the bodies 1 and 2 to be connected together are designed as rectangular-shaped half shells of a ventilator housing. The half shells 1 and 2 are provided with corresponding bending sections 3 and empty sections 4 which are interengaged in the manner as previously described with a rod-shaped member 5 inserted into the pair of channels defined by bending sections 3 on both sides of the assembly.

Figure 9:
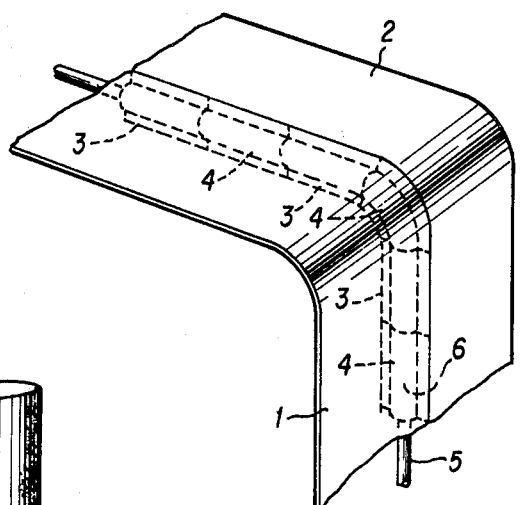
FIG. 9 is a fragmentary perspective view showing curved portions of thin-walled bodies connected together according to the invention.

As seen in FIG. 9, bodies 1 and 2 are formed from sheet metal parts of curved configuration and extending between two planes, e.g. body parts. Bending sections 3 of one body engage through empty sections 4 of the other body, with bending sections 3 being supported on a rod-shaped member 5 inserted in the channel defined thereby, thus connecting bodies 1 and 2 to each other. With such bent bodies, the use of members 5 made from elastic material or even such members made from elastic spring-loaded materials is necessary. Member 5 can be made from a suitable metallic material or other such suitable working material. Moreover, member 5 can be made from a helical spring.

Figure 10:
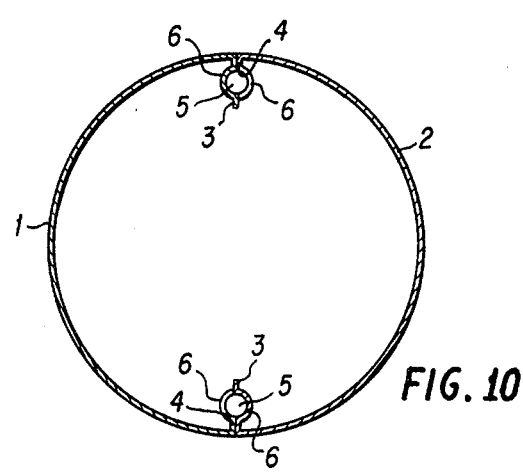
FIG. 10 depicts bodies in the form of semicylindrical sections connected together according to the invention.

Bodies 1 and 2 in the form of semicylindrical half shells are shown in FIG. 10 connected by the arrangement of the present invention. Bending sections 3 define channels through which rod-shaped members 5 are inserted in the same aforedescribed manner.

Figure 11:
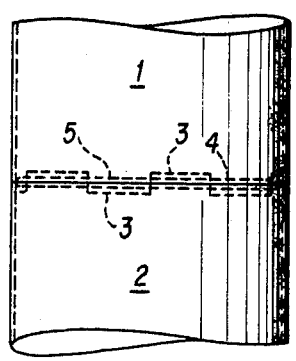
FIG. 11 depicts the connection of bodies in the form of tube sections according to the invention.
Figure 12:
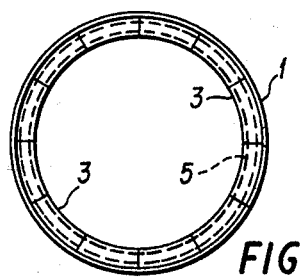
FIG. 12 is a top view of FIG. 11 depicting the connection arrangement therein.

FIGS. 11 and 12 disclose a further embodiment of the invention wherein the bodies 1 and 2 to be connected are defined by tubular sections. The latter are each provided with bending sections 3 and empty sections 4 disposed alternately to each other with the edge areas turned to define a circular channel through which a rod member 5 in the form of a flexible or spring-loaded plastic body is inserted.

It is to be understood that the forms of the invention herein shown and described are to be taken as preferred examples of the same, and that various changes in shape, size and arrangement of parts may be resorted to, without departing from the spirit of the invention or scope of the subjoined claims.

I claim:

1. An improved arrangement for joining adjacent edge areas of thin-walled bodies, wherein the corresponding edge areas are each provided with a plurality of bent sections and a plurality of recesses, with the bent sections and recesses of one edge area being offset with respect to the bent sections and recesses of the corresponding edge area, thereby permitting the bent sections of one edge area to be disposed through the recesses of the corresponding edge area so that the bent sections of both edge areas collectively define a cylindrical channel for receiving an elongate member to secure the bodies together, which arrangement comprises:
   (a) a corner section carried by each edge area and disposed transversely to the plane of its corresponding body to define a free end;
   (b) the plurality of bent sections are carried by the free end of each corner section, with each bent section having a substantially semi-cylindrical depression and separated from an adjacent bent section by a recess;
   (c) the depressions of the bent sections of one corner section alternate with and are adjacent to the depressions of the bent sections of the corresponding corner section;
   (d) when the edge areas are joined to form the cylindrical channel, the joined bodies define an interior joint side and an exterior joint side, wherein;
      i. the cylindrical channel and corner sections are disposed on and visible only from the interior joint side; and
      ii. the exterior joint side presents a linear joint line defined by abutting portions of the edge areas; and
   (e) elongated means disposed in the cylindrical channel for securing the edge areas together.

* * * * *